United States Patent

[11] 3,580,163

[72] Inventor Claude S. Farrell, Jr.
 Northbrook, Ill.
[21] Appl. No. 796,793
[22] Filed Feb. 5, 1969
[45] Patented May 25, 1971
[73] Assignee Cory Corporation

[54] VARIABLE CAPACITY COFFEE PERCOLATOR
 32 Claims, 9 Drawing Figs.
[52] U.S. Cl. ................................................... 99/310
[51] Int. Cl. ............................................. A47j 31/04
[50] Field of Search ..................................... 99/307,
 308, 310, 311, 312, 309, 306, 313, 314, 302, 303

[56] References Cited
 UNITED STATES PATENTS

| | | | |
|---|---|---|---|
| 408,707 | 8/1889 | Goodrich | 99/310 |
| 961,096 | 6/1910 | Biggins | 99/310 |
| 1,092,575 | 4/1914 | Jessup | 99/310 |
| 1,167,775 | 1/1916 | Miller | 99/310 |
| 1,550,336 | 8/1925 | Bingham | 99/310 |

*Primary Examiner*—Robert W. Jenkins
*Attorney*—Hofgren, Wegner, Allen, Stellman and McCord ABSTRACT: In a percolator having a pump stem for carrying a brewing basket adjacent the upper open end of the receptacle, or pot, cooperating means are provided on the stem and basket for selectively positioning the basket in a normal brewing position within the receptacle and in an extra-capacity position upwardly thereof whereby an additional quantity of beverage such as coffee may be brewed in the receptacle. The percolator includes a cover removably carried on the basket and provided with means for deflecting the hot pumped water downwardly onto the beverage charge in the basket in each of the normal and extra-capacity positions of the basket.

The cooperating support means may comprise shoulder means on the stem and basket. Alternatively, the support means may comprise a spring clip carried by the stem and having portions selectively engageable with the basket. The extra capacity of the percolator may be substantial, such as over 4 cups. The sidewall of the basket may be imperforate to preclude spillage of the hot water such as when the basket is raised to be substantially outward of the open top of the receptacle.

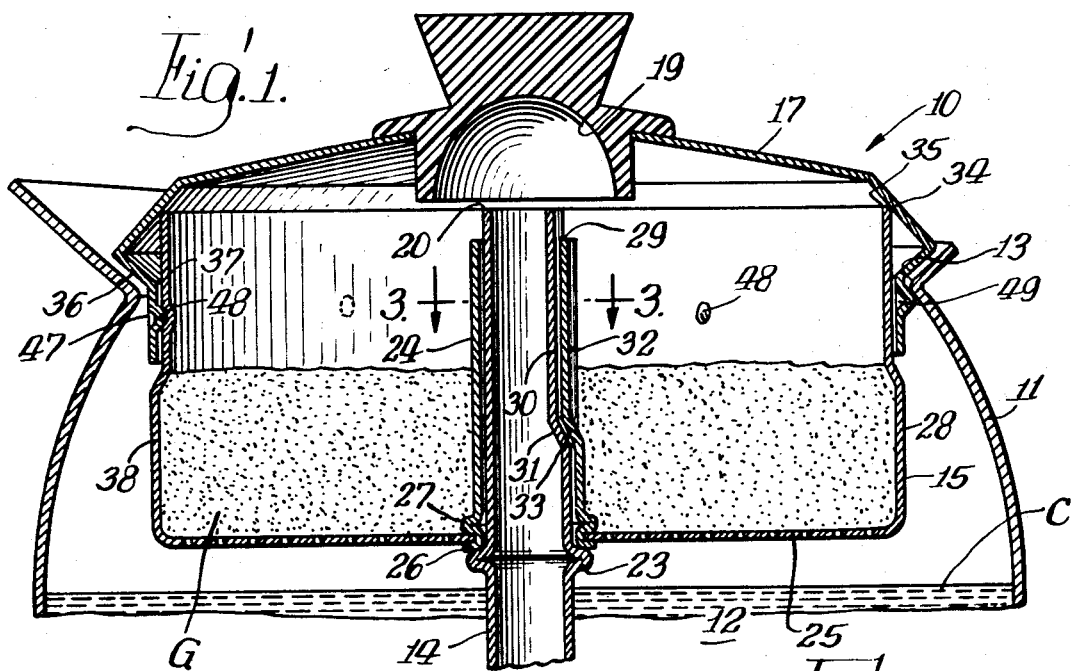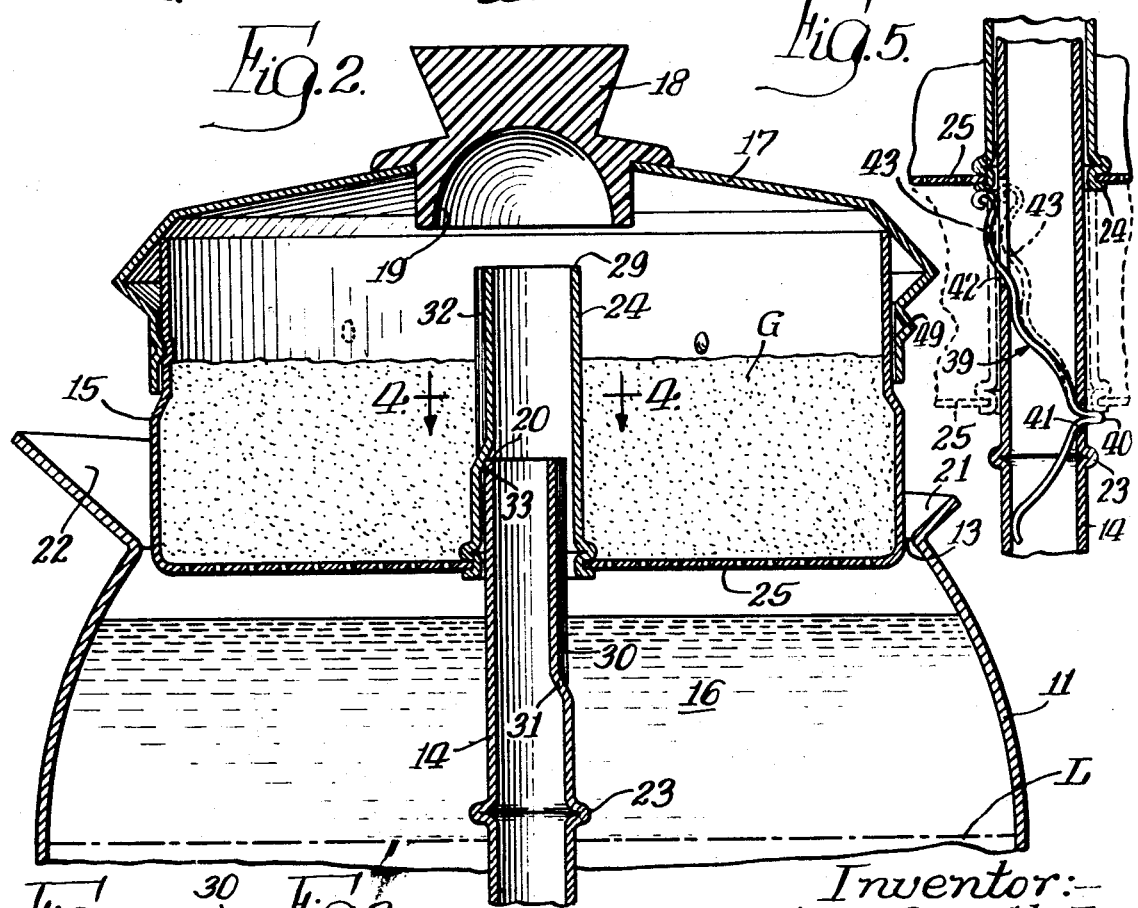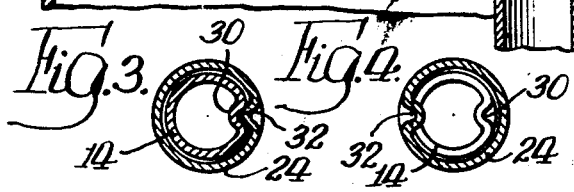

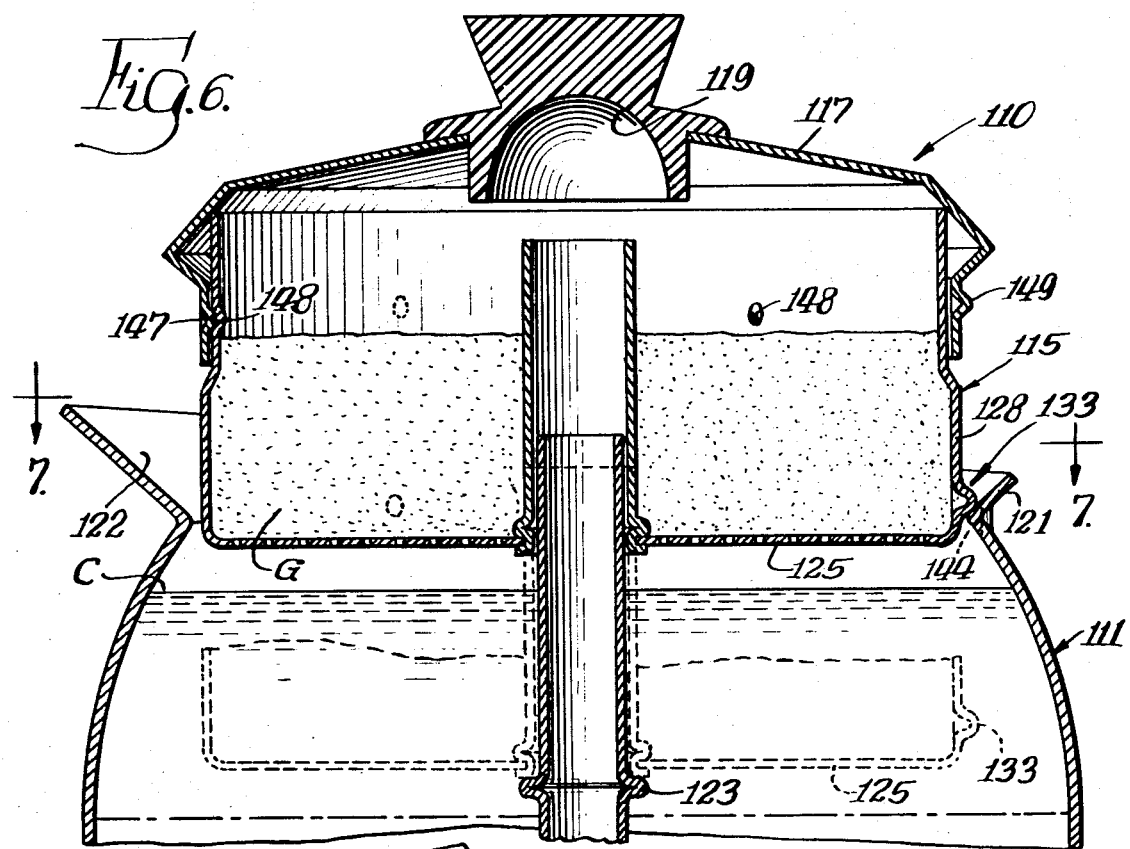
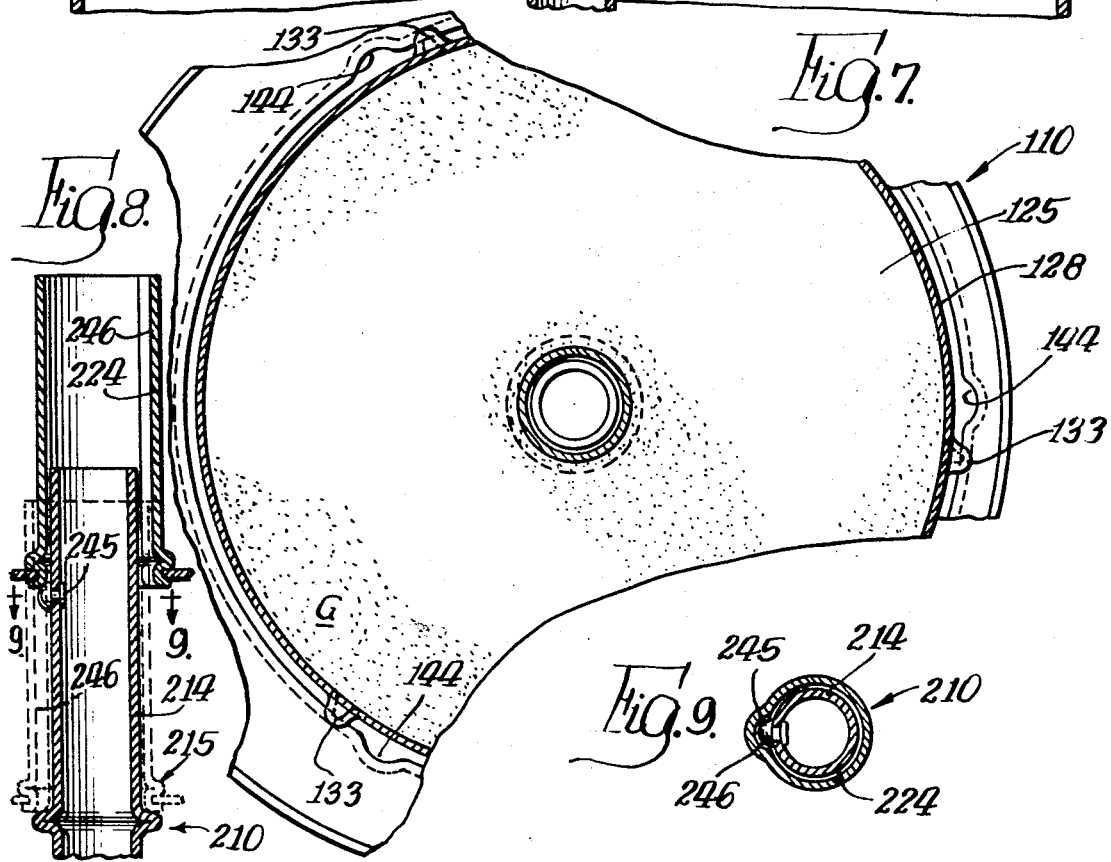

VARIABLE CAPACITY COFFEE PERCOLATOR

BACKGROUND OF THE INVENTION

1. Field of the Invention

This invention relates to beverage brewing devices and in particular to percolator devices.

2. Description of the Prior Art

In the conventional percolator, a pump stem is provided adjacent its upper end with an annular shoulder for removably carrying a charge holding basket to receive hot water pumped upwardly through the upper open end of the pump stem. The receptacle is preselected to have a maximum capacity corresponding to the charge holding capacity of the basket. The percolator may be operated in any suitable fashion such as by placement on a heat source such as a kitchen range, or may be electrically operated as by incorporated electrical heating means. The pumped hot water flows from the pump stem downwardly through the ground coffee in the basket, leaches desirable oils therefrom to form the coffee infusion, and flows downwardly from the basket back to the main body of the receptacle for recirculation by the pump. The percolation is continued until the brewed coffee reaches the proper strength and may be suitably terminated manually or automatically.

There are times, however, when the user wishes to make a somewhat greater quantity of coffee as compared to that which is the normal full capacity of the percolator. With the conventional percolator it is necessary to make several batches of coffee in succession to obtain the total desired increased quantity.

SUMMARY OF THE INVENTION

The present invention comprehends an improved percolator having means providing an extra-capacity functioning to permit the user to obtain a quantity of coffee in excess of that normally provided as the maximum quantity from the percolator. The extra-capacity structure is extremely simple and economical of construction while yet providing this highly desirable feature.

More specifically, the invention comprehends the provision of an extra-capacity percolator including a receptacle, or pot, for holding percolated beverage such as coffee. The receptacle includes an upper open portion through which a pump stem and basket supported thereby are inserted for conducting the brewing operation. The basket is selectively supported in a first, normal position substantially within the receptacle with the basket bottom at a first level below the receptacle opening. Thus, the receptacle defines a space below the basket bottom in its normal position for holding a normal maximum quantity of percolated beverage. The support means further includes a second portion for supporting the basket in an above normal position with at least a portion of the basket extending upwardly through the receptacle opening to define below the basket an enlarged space providing an extra capacity of brewed beverage.

The invention further comprehends the provision of such a reserve-capacity percolator wherein the basket is provided with a pump stem extension for conducting the pumped fluid upwardly from the upper end of the stem into the top portion of the basket when the basket is in the second, raised position.

The support means may comprise cooperating shoulders on the pump stem and basket. Alternatively, the support means may comprise adjustable lug means and, more specifically, may comprise resilient spring means. Still further, the support means may comprise cooperating means on the basket and receptacle. Yet further, the support means may comprise projection means on the stem, such as a rivet thereon, and cooperating groove means on the basket structure.

The percolator may be provided with a cover removably resting on the top of the basket. The cover may be provided with a deflector for directing the pumped liquid downwardly onto the coffee charge in the basket. The cover and basket are provided with cooperating means for releasably retaining the cover on the basket. The cover and receptacle may be provided with cooperating means for retaining the cover on the receptacle.

The basket may have an imperforate sidewall to preclude spillage of the pumped liquid as when the basket is in the upper position wherein at least a portion of the sidewall is exposed upwardly of the receptacle.

BRIEF DESCRIPTION OF THE DRAWING

Other features and advantages of the invention will be apparent from the following description taken in connection with the accompanying drawing wherein:

FIG. 1 is a fragmentary vertical diametric section of a percolator embodying the invention;

FIG. 2 is a view similar to FIG. 1 but with the basket in an upper extra-capacity position;

FIG. 3 is a fragmentary transverse section taken substantially along the line 3–3 of FIG. 1;

FIG. 4 is a fragmentary transverse section taken substantially along the line 4–4 of FIG. 2;

FIG. 5 is a fragmentary vertical diametric section illustrating a modified form of basket support means embodying the invention;

FIG. 6 is a fragmentary vertical diametric section of a modified form of percolator embodying the invention;

FIG. 7 is a fragmentary horizontal section taken substantially along the line 7–7 of FIG. 6;

FIG. 8 is a fragmentary vertical section of still another percolator structure embodying the invention; and FIG. 9 is a horizontal section taken substantially along the line 9–9 of FIG. 8.

DESCRIPTION OF THE PREFERRED EMBODIMENTS

In the exemplary embodiment of the invention as discussed in FIGS. 1—4 of the drawing, a percolator generally designated 10 is shown to comprise a receptacle, or pot, 11 defining a space 12 for holding a preselected maximum quantity of brewed beverage such as coffee C. The receptacle is provided with an upper end 13 defining an opening through which a pump stem 14 may be selectively moved. The pump stem may be provided with a conventional dome or similar pump means (not shown) at its lower end. The percolator further includes a basket 15 removably carried on the pump stem for selective disposition in a first, normal position upwardly within the receptacle 11 as shown in FIG. 1, and a second, above-normal position wherein at least a portion of the basket is disposed upwardly of the opening 13 as shown in FIG. 2. Thus, in the raised disposition of the basket 15 as shown in FIG. 2, a reserve capacity space 16 is provided in the receptacle 11 above the upper level L of the normal brew holding space 12. Space 16 herein is preferably substantial and in the illustrative embodiment may have a capacity of approximately 4½ cups.

The basket may be provided with a removable cover 17 provided with an upper handle 18. The cover further defines a downwardly facing deflector surface 19 which in the illustrated embodiment is formed in the handle 18 coaxially above the upper end 20 of the pump stem 14 for deflecting upwardly pumped hot brewed liquid downwardly onto the ground coffee or other beverage-forming ingredients G placed in the basket 15.

More specifically, the receptacle 11 is provided at its upper end with an out-turned flange 21 defining at one portion a pouring spout 22. The upper end 20 of the pump stem extends to adjacent the level of the upper opening 13. The pump stem is provided with a first annular shoulder 23, illustratively slightly above the level L, for supporting the basket 15 in the normal position of FIG. 1. As shown, the basket is provided with a tubular member 24 upstanding from the center of the bottom perforate wall 25 thereof and defining a downwardly facing annular shoulder 26 selectively removably resting on the pump stem shoulder 23. As shown in FIG. 1, the shoulder 26 may be defined by a crimped lower end 27 of the tubular member 24. The axial extent of the tubular member 24 is somewhat less than the height of the cylindrical sidewall 28 of the basket and, thus, as shown in FIG. 1, in the normal position, the upper end 20 of the pump stem extends upwardly from the upper end 29 of the tubular member 24.

The pump stem is provided with a longitudinal concave inset portion 30 extending downwardly from the upper end 20 to an out-turned shoulder portion 31 spaced above the shoulder 23. The tubular member 24 is provided with a corresponding longitudinal concave inset portion 32 terminating at its lower end in a shoulder 33 adjacent shoulder 31 in the normal position of the basket as shown in FIG. 1. As shown in FIG. 3, the inset portions 30 and 32 are complementary and permit the tubular member 24 to have nesting relationship with the upper end of the pump stem in the normal position of the basket 15.

The cover 17 is provided with an annular support portion 34 removably resting on the upper end 35 of the basket sidewall 28 to dispose the deflector surface 19 coaxially superjacent the upper end 20 of the pump stem in the normal position of the basket. As shown in FIG. 1, the cover is provided with a depending inturned portion 36 extending downwardly through opening 13 in circling relationship to the basket sidewall 28. As further shown in FIG. 1, the basket sidewall may be provided with an upper reduced diameter portion 37 and a lower enlarged diameter portion 38.

Thus, in the normal position of the brewing basket 15, the percolator 10 defines the normal maximum brewing space 12 below the bottom wall 25 of the basket permitting the user to make a preselected maximum quantity of brewed beverage in the normal manner. When, however, the user wishes to make an extra capacity, i.e., a capacity greater than the normal maximum provided in the arrangement of the percolator shown in FIG. 1, the user merely repositions the basket relative to the pump stem to dispose the basket in the upper extra-capacity position of FIG. 2 to thereby provide the extra-capacity space 16 for holding a preselected maximum quantity of brewed beverage.

More specifically, as shown in FIG. 2, the basket 15 is rotated 180° from the position thereof in FIG. 1 so that when the basket is telescoped downwardly on the upper end of the pump stem, the shoulder 33 of the tubular member 24 engages the upper end 20 of the pump stem 14 to limit the telescoping movement to the illustrated disposition wherein the basket bottom wall 25 is closely subjacent the receptacle opening 13 thereby defining the reserve-capacity space 16 between this level of the basket bottom wall 25 and the normal upper level L of the normal beverage holding space 12. As shown in FIGS. 2 and 4, the tubular member 24 has a sufficiently close fit with the upper end of the pump stem to define an upward extension of the pump stem for conducting upwardly pumped hot liquid upwardly from the upper end 29 of the tubular member to be deflected by the deflector surface 19 downwardly onto the ground charge G in a manner similar to the delivery of the hot liquid when the basket is in the normal position of FIG. 1. As shown, the basket may be disposed substantially fully upwardly of opening 13 with the imperforate sidewall 28 preventing spillage of the pumped liquid outwardly from the basket in this raised, reserve-capacity position. At the same time, the cover 17 maintains the disposition of the deflector surface 19 suitably superjacent the upper end of the pump delivery passage, now defined by tubular member end 29, to provide the desired spreader effect for efficient brewing.

Turning now to the embodiment of the invention illustrated in FIG. 5, the means for supporting the basket selectively in the lower, normal position and the upper, reserve-capacity position may comprise an adjustable lug member 39. Herein, the lug member illustratively comprises a spring clip having a first shoulder portion 40 superjacent the stem shoulder 23 for engaging the basket bottom wall 25 in the lower position thereof. The spring clip may be carried in the pump stem 14 with the shoulder 40 extending outwardly through a suitable opening 41 therein to retain the spring clip in the desired position axially of the pump stem. The pump stem may be further provided with a vertically elongated opening 42 spaced above and diametrically opposite the opening 41 through which the upper end 43 of the spring clip may extend when the basket bottom 25 is disposed thereabove as shown in full lines of FIG. 5. The spring end 43 is urged manually inwardly through the opening 42 to be disposed inwardly of the tubular member 24 when it is desired to dispose the basket in the lower, normal position, this disposition of the spring clip end 43 being illustrated in dotted lines in FIG. 5. Thus, the spring clip lug member 39 functions in a manner similar to the cooperating shoulders 23, 26, 33 and 20 of the first embodiment to provide the desirable selective normal and reserve-capacity positioning of the basket 15.

As shown in FIGS. 6 and 7, the invention further comprehends the selective retention of the percolator basket in the first and second positions by means cooperating between the basket and receptacle. More specifically, as shown in FIGS. 6 and 7, a modified form of percolator generally designated 110 is shown to include a basket 115 similar to basket 15 of percolator 10, but having support structure 133 for engaging the flange 121 of the receptacle 111 to releasably support the basket in the upper, or second position. As best seen in FIG. 7, the support structure 133 may comprise a plurality, herein 3, upwardly projecting portions on the sidewall 128 of the basket 115 adjacent the bottom wall 125. As shown in FIG. 7, the projections 133 may be simultaneously spaced about the axis of the basket to provide a stable three-point support of the basket on the receptacle flange 121.

The receptacle flange 121 is provided with a corresponding plurality of recesses 144 which, when the projections 133 are aligned therewith, permit passing of the projections therethrough as to permit repositioning of the basket from the second, upper position shown in full lines in FIG. 6, to the first, lower position shown in dotted lines therein. The alignment and disalignment of the projections relative to the recesses 144 is effected by a simple turning of the basket about the vertical axis thereof providing facilitated positioning of the basket as desired by the user. In the lower position, the basket may rest on the stem shoulder 123, as in percolator 10.

The invention comprehends that one of the recesses 144 may be aligned with the spout 122 of the receptacle. The invention is not limited to any particular number of supporting projections 133.

Referring now to FIGS. 8 and 9, a still further modified form of percolator structure generally designated 210 is shown providing the desirable selective disposition of the basket 215 in the upper and lower positions, such as provided in percolators 10 and 110. In percolator structure 210, however, the basket is selectively supported in the second, upper position by means of a projecting element such as rivet 245 on the stem 214. The tubular member 224 of the basket 215 is provided with a longitudinal clearance groove 246 which, when aligned with the rivet 245 as shown in FIG. 9, permits the tubular member 224 to pass downwardly to the lower position shown in dotted lines in FIG. 8 and which, when disaligned relative to the rivet 245, permits the rivet to support the basket in the upper full line position of FIG. 8.

Each of the percolator structures 110 and 210 is generally similar to percolator structure 10 except as otherwise noted above. Reference numerals identifying similar elements of the three percolator structures are similar except 100 different.

The invention still further comprehends means for releasably retaining the cover 17 on the percolator basket. Thus, as shown in FIG. 1, the tubular support portion 34 is provided with a plurality of upset tabs 47 which cooperatively interlock with corresponding inset recesses 48 in the sidewall 28 of the basket 15. The tabs are disposed to retain the cover in juxtaposed overlying relationship to the basket against the force of the pumped liquid which is directed from the upper end 20 of the stem 14 against the deflector 19. Still further as shown in FIG. 1, the support portion 34 is provided with a plurality of outwardly projecting tabs 49 adapted to pass under the shoulder 13 defining the upper open end of the receptacle 11 and thereby retain the core 17 releasably against upward movement through the open end 13.

The percolators 10, 110 and 210 may be formed of suitable conventional materials such as stainless steel, aluminum, ceramics, and the like. The handle 18 may be formed of an insulating material such as a thermosetting plastic. Thus, the invention comprehends an improved reserve-capacity percolator which is extremely simple and economical of construction while yet providing long, substantially trouble-free life. The selective arrangement of the percolator in the normal and reserve-capacity positions may be readily and simply effected by the user in each of the illustrated embodiments.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. In a percolator including a receptacle for holding percolated beverage, said receptacle having an upper opening, a pervious basket for holding beverage-forming material, said basket having a bottom, and percolator pump means in said receptacle provided with an upstanding stem having an open upper end adjacent said opening, basket supporting means selectively supporting the basket in a first, normal position substantially within the receptacle with the basket bottom at a first level below said opening defining a space in the receptacle for holding a normal quantity of percolated beverage, and in a second, above-normal position with at least a portion of the basket extending upwardly through the receptacle opening with the basket bottom at a second level above said first level such that a major portion of said basket is disposed upwardly of said receptacle opening, the space in the receptacle between said levels comprising a reserve-capacity space for holding a preselected additional quantity of percolated beverage, and means overlying the upper end of the pump means for guiding hot brewing liquid from the pump means into the basket for forming percolated beverage from said beverage-forming material therein to flow downwardly therefrom through the pervious basket into the receptacle selectively in either of said basket positions.

2. The percolator means of claim 1 wherein said basket supporting means comprises cooperating shoulder means on said basket and stem.

3. The percolator means of claim 1 wherein said supporting means are arranged to support said basket in rotationally different dispositions in said respective first and second positions.

4. The percolator means of claim 1 wherein said basket bottom is substantially at the level of said receptacle opening in said second position.

5. The percolator means of claim 1 wherein the last named means comprises a cover carried by said basket.

6. The percolator means of claim 5 further including concave means on said cover for directing liquid pumped upwardly to an upper portion of the basket downwardly toward said basket bottom.

7. The percolator means of claim 1 wherein said basket includes a sidewall having an upper imperforate portion extending downwardly to said opening when said basket is in said second position.

8. The percolator means of claim 1 wherein substantially the entire sidewall of said basket is imperforate.

9. The percolator means of claim 1 wherein said basket supporting means includes cooperating shoulders on said receptacle and basket.

10. The percolator means of claim 1 wherein said basket supporting means includes cooperating means on said basket and said stem.

11. The percolator means of claim 1 wherein the last named means comprises a cover carried by said basket and cooperating means on said cover and basket to secure the cover removably to the basket.

12. The percolator means of claim 1 wherein said last named means comprises a cover having a depending rim and said percolator means further include cooperating means on said rim and basket to secure the cover removably to the basket.

13. In a percolator including a receptacle for holding percolated beverage, said receptacle having an upper opening, a pervious basket for holding beverage-forming material, said basket having a bottom, and percolator pump means in said receptacle provided with an upstanding stem having an open upper end adjacent said opening, basket supporting means selectively supporting the basket in a first, normal position substantially within the receptacle with the basket bottom at a first level below said opening defining a space in the receptacle for holding a normal quantity of percolated beverage, and in a second, above-normal position with at least a portion of the basket extending upwardly through the receptacle opening with the basket bottom at a second level above said first level, the space in the receptacle between said levels comprising a reserve-capacity space for holding a preselected additional quantity of percolated beverage, and means overlying the upper end of the pump means for guiding hot brewing liquid from the pump means into the basket for forming percolated beverage from said beverage-forming material therein to flow downwardly therefrom through the pervious basket into the receptacle selectively in either of said basket positions, said basket supporting means comprising a first shoulder on said basket, a second shoulder on said stem at a first level, and a second shoulder on said stem at a second level above said first level, said first shoulder being arranged to rest selectively on either said second or third shoulders to dispose said basket correspondingly in either of said first and second positions.

14. The percolator means of claim 13 wherein said second and third shoulders are angularly spaced relative to the longitudinal axis of said stem.

15. The percolator means of claim 13 wherein said second and third shoulders are disposed at longitudinally spaced, diametrically opposite portion of said stem.

16. The percolator means of claim 13 wherein said basket is provided with an upstanding tubular member and said first shoulder comprises a concave portion of said tubular member.

17. The percolator means of claim 16 wherein said stem is provided at its upper end with a concave portion defining at its lower end said second shoulder.

18. The percolator means of claim 13 wherein said third shoulder comprises an upper end of said stem.

19. In a percolator including a receptacle for holding percolated beverage, said receptacle having an upper opening, a pervious basket for holding beverage-forming material, said basket having a bottom, and percolator pump means in said receptacle provided with an upstanding stem having an open upper end adjacent said opening, basket supporting means selectively supporting the basket in a first, normal position substantially within the receptacle with the basket bottom at a first level below said opening defining a space in the receptacle for holding a normal quantity of percolated beverage, and in a second, above-normal position with at least a portion of the basket extending upwardly through the receptacle opening with the basket bottom at a second level above said first level, the space in the receptacle between said levels comprising a reserve-capacity space for holding a preselected additional quantity of percolated beverage, and means overlying the upper end of the pump means for guiding hot brewing liquid from the pump means into the basket for forming percolated beverage from said beverage-forming material therein to flow downwardly therefrom through the previous basket into the receptacle selectively in either of said basket positions, said supporting means comprising an adjustable lug member.

20. The percolator means of claim 19 wherein said lug member is carried by said stem.

21. The percolator means of claim 19 wherein said lug member has first and second spaced portions selectively engageable with said basket in said first and second positions.

22. The percolator means of claim 19 wherein said lug member comprises a spring clip.

23. The percolator means of claim 19 wherein said lug member is disposed substantially fully within said stem.

24. In a percolator including a receptacle for holding percolated beverage, said receptacle having an upper opening, a pervious basket for holding beverage-forming material, said basket having a bottom, and percolator pump means in said receptacle provided with an upstanding stem having an open upper end adjacent said opening, basket supporting means selectively supporting the basket in a first, normal position substantially within the receptacle with the basket bottom at a first level below said opening defining a space in the receptacle for holding a normal quantity of percolated beverage, and in a second, above-normal position with at least a portion of the basket extending upwardly through the receptacle opening with the basket bottom at a second level above said first level, the space in the receptacle between said levels comprising a reserve-capacity space for holding a preselected additional quantity of percolated beverage, and means overlying the upper end of the pump means for guiding hot brewing liquid from the pump means into the basket for forming percolated beverage from said beverage-forming material therein to flow downwardly therefrom through the previous basket into the receptacle selectively in either of said basket positions, said pump stem upper end projecting upwardly coaxially through the bottom wall of said basket, said basket being provided with a tubular member upstanding from the bottom wall in coaxial surrounding association with said upper end of the pump stem.

25. The percolator means of claim 24 wherein the tubular member has a sufficiently close fit with the upper end of the pump stem to define an upward extension of said pump stem for conducting the pumped liquid upwardly from said upper end of said pump stem into an upper portion of said basket when said basket is in said second position.

26. The percolator means of claim 24 wherein the pump stem extends to upwardly of the upper end of the tubular member when said basket is in the first, normal position.

27. In a percolator including a receptacle for holding percolated beverage, said receptacle having an upper opening, a pervious basket for holding beverage-forming material, said basket having a bottom, and percolator pump means in said receptacle provided with an upstanding stem having an open upper end adjacent said opening, basket supporting means selectively supporting the basket in a first, normal position substantially within the receptacle with the basket bottom at a first level below said opening defining a space in the receptacle for holding a normal quantity of percolated beverage, and in a second, above-normal position with at least a portion of the basket extending upwardly through the receptacle opening with the basket bottom at a second level above said first level, the space in the receptacle between said levels comprising a reserve-capacity space for holding a preselected additional quantity of percolated beverage, and means overlying the upper end of the pump means for guiding hot brewing liquid from the pump means into the basket for forming percolated beverage from said beverage-forming material therein to flow downwardly therefrom through the pervious basket into the receptacle selectively in either of said basket positions, said basket supporting means including projecting means on said basket, and an annular shoulder on said receptacle arranged to have said projecting means rest thereon to support the basket on the receptacle in said second position, said annular shoulder having a recess therein adapted to pass said projecting means to permit movement of the basket to said first position.

28. The percolator means of claim 27 wherein said receptacle defines a pouring spout and said recess is disposed at said pouring spout.

29. In a percolator including a receptacle for holding percolated beverage, said receptacle having an upper opening, a pervious basket for holding beverage-forming material, said basket having a bottom, and percolator pump means in said receptacle provided with an upstanding stem having an open upper end adjacent said opening, basket supporting means selectively supporting the basket in a first, normal position substantially within the receptacle with the basket bottom at a first level below said opening defining a space in the receptacle for holding a normal quantity of percolated beverage, and in a second, above-normal position with at least a portion of the basket extending upwardly through the receptacle opening with the basket bottom at a second level above said first level, the space in the receptacle between said levels comprising a reserve-capacity space for holding a preselected additional quantity of percolated beverage, and means overlying the upper end of the pump means for guiding hot brewing liquid from the pump means into the basket for forming percolated beverage from said beverage-forming material therein to flow downwardly therefrom through the pervious basket into the receptacle selectively in either of said basket positions, said cooperating means comprising projecting means on said stem, and an annular shoulder on said basket arranged to rest on said projecting means to support the basket in said second position, said annular shoulder having a recess therein adapted to pass said projecting means to permit movement of the basket to said first position.

30. The percolator means of claim 29 wherein said projecting means comprises a rivet secured to said stem.

31. The percolator means of claim 29 wherein said cooperating means comprise shoulder means.

32. In a percolator having a brewing basket received in a liquid holding receptacle having an upper opening defined by an inwardly projecting shoulder, a cover extending across the upper opening to close the receptacle, and means removably supporting the cover on said basket comprising an annular depending rim on said cover concentrically circling the basket, said basket and rim being provided with cooperating detent locking means for releasably retaining the cover in association with said basket, said cover further including tabs adapted to pass under said receptacle shoulder for removably retaining the cover on the liquid holding receptacle.